US006575875B2

(12) United States Patent
Holmes

(10) Patent No.: US 6,575,875 B2
(45) Date of Patent: Jun. 10, 2003

(54) SYSTEM FOR CONTROLLING AN AUTOMATIC TRANSMISSION THROTTLE VALVE

(76) Inventor: Stephen G. Holmes, 13176 Red Cedar St., Victorville, CA (US) 92392

( * ) Notice: Subject to any disclaimer, the term of this patent is extended or adjusted under 35 U.S.C. 154(b) by 0 days.

(21) Appl. No.: 09/767,059

(22) Filed: Jan. 22, 2001

(65) Prior Publication Data

US 2002/0096144 A1 Jul. 25, 2002

(51) Int. Cl.[7] .................................... F16H 59/30

(52) U.S. Cl. ..................... 477/121; 74/502.4; 123/400

(58) Field of Search ..................... 477/121; 74/502.4, 74/502.6; 123/184.21, 184.46, 400, 336, 338, 337

(56) References Cited

U.S. PATENT DOCUMENTS 4,320,673 A * 3/1982 Wegert ..................... 477/121
4,631,983 A * 12/1986 Morisawa et al. .......... 251/294
5,046,380 A * 9/1991 Matsumoto et al. ....... 74/502.4
5,078,111 A * 1/1992 McCann ..................... 123/400
5,291,870 A * 3/1994 Covey, Jr. ................... 123/545
5,295,408 A * 3/1994 Nagle et al. ........... 74/501.5 R
5,638,721 A * 6/1997 Lee ........................... 123/319
5,758,614 A * 6/1998 Choi ..................... 123/184.53
6,167,867 B1 * 1/2001 Garrick ...................... 123/400
6,205,754 B1 * 3/2001 Laskowski .................. 56/15.1
6,463,826 B1 * 10/2002 Bouchillon ................ 74/502.6

* cited by examiner

*Primary Examiner*—Rodney H. Bonck
*Assistant Examiner*—David D. Le
(74) *Attorney, Agent, or Firm*—Timothy Thut Tyson; Ted Masters; Freilich, Hornbaker & Rosen

(57) ABSTRACT

A system (20) for controlling a transmission throttle valve in a vehicle having a fuel management device (500) having a rotatable linkage member (508) includes an adapter plate (22) which is mountable beneath the fuel management device (500), a bracket (26) which is connectable to the adapter plate (22), and a throttle valve cable (30) which is connectable to the bracket (26). Throttle valve cable (30) has a tubular housing (32) which is fixedly connectable to bracket (26) and a cable (34) which is slidably disposed within tubular housing (32), the cable (34) having a first end (36) and an opposite second end connectable to the transmission throttle valve. First end (36) is selectively connectable along a slot (40. Different first end (36) connection positions along slot (40) result in correspondingly different rates of cable pull and therefore different transmission responses.

23 Claims, 9 Drawing Sheets

SYSTEM FOR CONTROLLING AN AUTOMATIC TRANSMISSION THROTTLE VALVE

TECHNICAL FIELD

The present invention pertains generally to automobiles having automatic transmissions, and particularly to a system for selectively controlling the actuation rate of the automatic transmission throttle valve.

BACKGROUND ART

The throttle valve, which is slidably movable in a bore, regulates the flow of transmission oil through the transmission's valve body. A linkage couples the position of the accelerator pedal to the throttle valve, and causes the throttle valve to move between an idle or low throttle position and a full or wide open throttle position. Throttle valve controlled transmissions utilize a cable running from the vehicle's fuel management system whether a fuel injector or carburetor to the transmission's valve body. The cable linkage between a modem fuel injector/carburetor system provides a signal method for proper transmission function. The cable connection is commonly known as the throttle valve (TV) cable. The TV cable connects the throttle mechanism to the transmission hydraulic control valve. The throttle valve reciprocates in a common bore in the transmission valve body, and is typically composed of a plunger, spring, and throttle valve. The positioned relationship of these components determines how the transmission will operate.

The TV cable is used to connect the carburetor linkage at one end, to a swinging lever at the other end. The swinging lever moves the throttle valve. Any movements of the carburetor linkage, during normal driving, results in a corresponding movement of the TV cable. Carburetors have a range of movement from idle to wide open throttle. As normal carburetor linkage movement pulls the TV cable, the swinging lever rotates thereby pushing the throttle valve plunger down its bore. This plunger has a designed operating range from fully outwardly extended to fully inwardly depressed. Even slight movement of the throttle valve linkage results in a corresponding movement of the throttle valve. As the throttle valve moves, it will adjust the shift timing, feel, and firmness of the transmission.

For the throttle valve system to function properly, actuation of the throttle valve must be proper for the particular vehicle. Just because the plunger (and therefore the TV) is mechanically made to move through its engineered spectrum of movement, does not mean the transmission will perform in the desired manner. The rate of movement at any given point can be altered by the dynamics of the carburetor linkage, and can dramatically affect transmission performance characteristics. When new cars are designed, the correct linkage relationship is established for each particular vehicle. This is done to satisfy the different transmission operating responses needed for the different types of vehicles. For example, a luxury car's TV system is not designed the same way as a performance car's TV system, nor as a pickup truck's TV system.

A problem exists when a throttle valve controlled transmission is to be installed in a vehicle for which it was not designed. Older automotive applications use carburetors for fuel management. All carburetors and modern fuel injection systems use a throttle shaft and a butterfly valve to control air intake. The available linkage attachment points on all popular carburetors and fuel injectors have both proven to be incorrect for proper TV control, and do not offer a method of "tuning" for different transmission responses. Of even more importance, older carburetor intake manifolds provide no correctly engineered point for mounting the TV cable. Additionally, the TV cable approach angle can have a dramatic effect on the dynamics of the cable pull.

Mechanisms for controlling transmission throttle valves are well known in the art. For example, U.S. Pat. No. 4,631,983 shows a lever mechanism for a cable linkage including a control lever mounted on a rotary shaft for rotation therewith, a base plate mounted on the rotary shaft and fixed to the control lever for rotation therewith, and a lever plate adjustably assembled with the base plate and connected at one side of its outer peripheral portion to one end of the cable linkage. The lever plate is provided at its outer peripheral portion with a semicircular guide surface having a center located substantially at a rotation fulcrum of the lever plate. The cable linkage is supported on the semicircular guide surface of the lever plate. And the lever plate is displaceable on the base plate. During the assembly process, the distance between the semicircular guide surface and the rotation fulcrum is adjustable.

U.S. Pat. No. 4,711,140 illustrates an improved throttle valve regulating system for automatic transmissions for motor vehicles. The throttle valve reciprocates in a bore as a result of the action of a plunger and a throttle valve spring to control the flow and pressure of transmission fluid or oil to effect gear shifting. A rigid spacing element of predetermined length received within the throttle valve spring is provided for urging the valve towards a full throttle position in the event that the valve sticks in the bore in a lower throttle position. The system further includes a high rate spring located in the full throttle position in the bore to prevent sticking of the valve in that position, and a low rate spring similarly positioned in the bore to counteract the force of the throttle valve spring for returning the throttle valve to a low throttle or zero position. The reciprocating throttle valve includes at least one land or circumferential flange having sharpened edges for shearing large particles or other impurities introduced into the bore with the transmission fluid which might otherwise become wedged between the valve and the bore and cause sticking of the valve in a fixed position in the bore.

U.S. Pat. No. 5,046,380 defines a throttle valve operating cam of an automatic transmission and an output control member of an automotive engine that are interconnected so as to cooperate with each other by a cable consisting of an outer tube and an inner cable. The inner cable is connected to the throttle valve operating cam and the output control member. One end of the outer tube is connected first to the automatic transmission. The other end of the outer tube is regulated in position relative to a cable fitting member secured to the automotive engine and then fixed to the cable fitting member secured to the automotive engine.

U.S. Pat. No. 5,295,408 discloses a strand end fitting having a housing adapted to be attached to a mounting pin located on a moveable member and having a passageway extending therethrough. The strand end fitting also includes a longitudinal member having an aperture therethrough telescopingly disposed within the passageway whereby a strand extends through the longitudinal member and has a retainer member secured thereon which abuts the longitudinal member. Once the longitudinal member is properly positioned within the housing, a locking structure prevents relative movement between the longitudinal member and the housing.

U.S. Pat. No. 5,727,425 comprises a method for adjusting the throttle valve cable in an automatic transmission. In a motor vehicle automatic transmission, for example a GENERAL MOTORS THM 700-R4 automatic transmission, the TV cable forms part of the mechanical link between the throttle pedal, the throttle valve linkage on a fuel delivery system (e.g., a carburetor or electronic fuel injector), and the throttle valve. The TV cable is adjusted using a sleeve and spring installed at the distal end of the TV cable between the cable end clamp and a teardrop shaped cable end fitting on the TV cable. The spring opposes the movement of the cable end fitting toward the distal end of the TV cable so that the cable end fitting is at its maximum distal position only at fully open throttle. This gives the vehicle operator the shift feel of a shorter TV cable at most throttle openings. The sleeve and spring are installed only on TV cables in automatic transmissions that do not have TV cable end fittings permanently attached to a throttle cam.

DISCLOSURE OF INVENTION

The present invention is directed to a system and method for controlling the throttle valve of automatic transmissions, and more particularly to a system and method which permits selective adjustment, or "tuning", of the rate at which the throttle valve is activated to adjust shift timing, firmness, and feel. This allows the installation of a modern throttle valve controlled automatic transmission into a vehicle for which it was not designed. Specifically, the linkage on older carburetors was never designed to provide the proper signal to newer throttle valve transmissions. The present invention provides a means of insuring not only the correct cable pull distance, but also of adjusting the characteristics of transmission operation. The present invention offers an installer the ability to accomplish both a correct cable pull distance which is a requirement fixed by the travel of the throttle valve while concurrently offering many different dynamic arc or cable pull relationships to "tune" the transmission response to a desired shift timing, firmness, and feel. One way this is accomplished is by giving the installer the ability to maintain the TV cable's approach angle in a fixed plane in relationship to the carburetor linkage. Through the use of spacers, a slot, and a hole pattern, the fixed plane may be raised or lowered to maintain a constant approach angle to the carburetor linkage attachment point. In a preferred embodiment, the approach angle is parallel to the bottom of the carburetor or fuel injection system. Another way the present invention allows the installer to tune the response is a sliding attachment point along a pre-engineered slot. The slot is designed to maintain a correct fixed pull distance at all slot positions while offering the installer wide latitude for adjusting the cable pull dynamics, including the rate at which the cable is pulled. As the attachment point is moved to different locations along the slot, the angular relationship between the pulling arm and the cable is changed. By using different settings along the slot, the transmission shift timing, firmness, and response aggressiveness can be adjusted over a wide spectrum. This provides the installer with a method of developing the desired transmission response while simultaneously maintaining the correct fixed cable pull distance.

In accordance with a preferred embodiment of the invention, an adapter plate is mounted beneath the fuel management device, a bracket is connected to the adapter plate, and the throttle valve cable is connected to the bracket.

In accordance with another preferred embodiment of the invention, the fuel management device has a rotatable linkage member to which is connected an adjustment mechanism having a slot. The throttle valve cable has a tubular housing fixedly connected to the bracket and a cable slidably disposed within the tubular housing. The first end of the cable is connected to the adjustments mechanism and an opposite second end is connected to the transmission throttle valve. The cable pull distance is substantially constant wherever the first end is selectively fixedly connectable along the slot.

In accordance with an important aspect of the invention, different first end connection positions along the slot result in correspondingly different rates of cable pull and therefore transmission response.

In accordance with an important feature of the invention, the slot can be either straight or slightly curved.

In accordance with another important aspect of the invention, the bracket is vertically adjustable with respect to the adapter plate.

Other features and advantages of the present invention will become apparent from the following detailed description, taken in conjunction with the accompanying drawings, which illustrate, by way of example, the principles of the invention.

MODES FOR CARRYING OUT THE INVENTION

Figure 1:
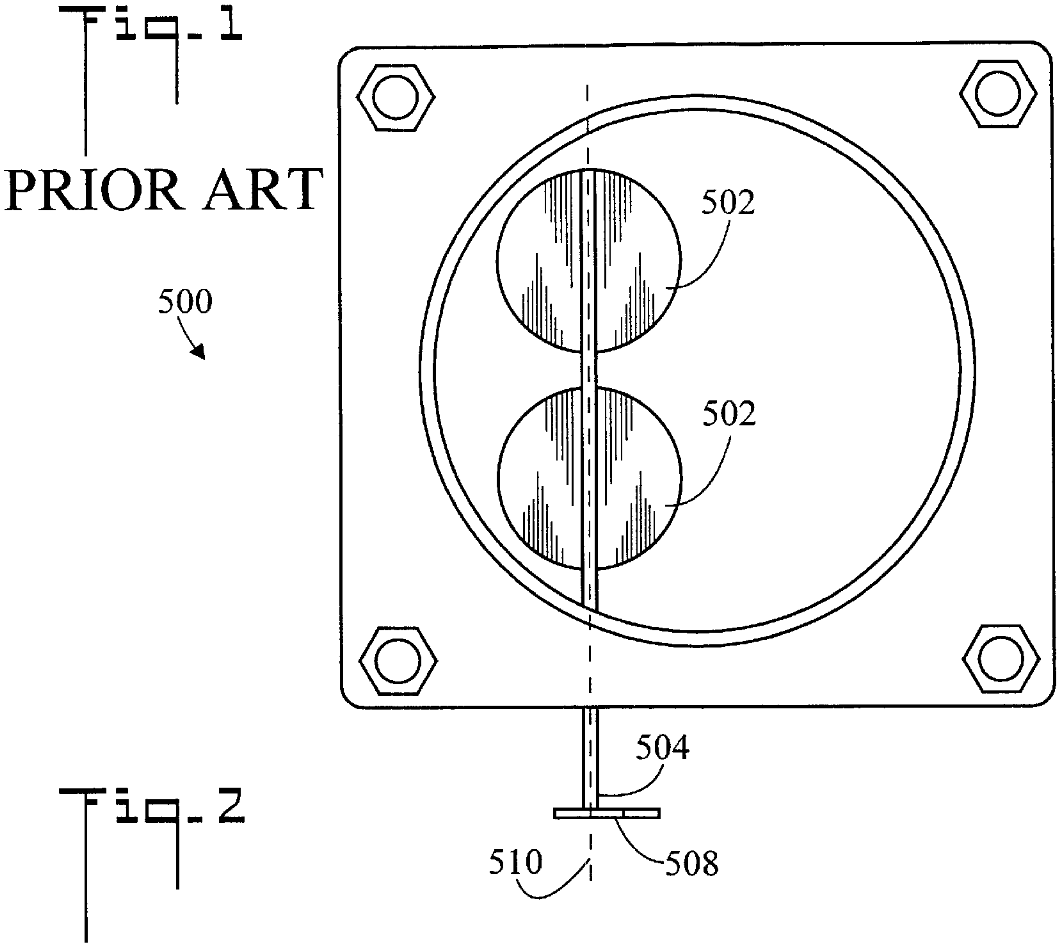
Fig. 1 PRIOR ART
FIG. 1 is a top plan view of a prior art fuel management device in an idle state.
Figure 2:
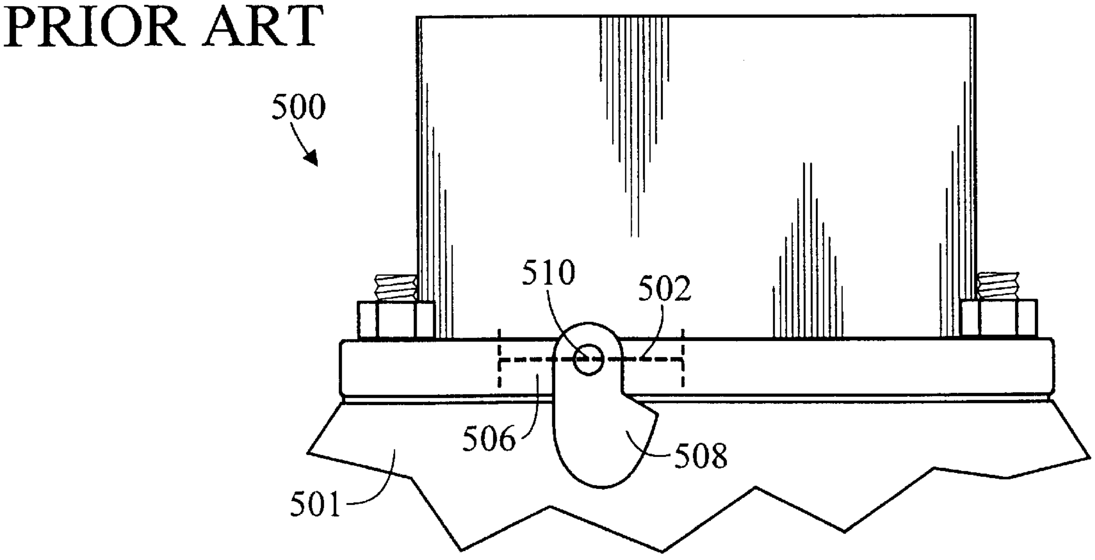
Fig. 2 PRIOR ART
FIG. 2 is a side elevation view of the prior art fuel management device in the idle state.

FIGS. 1 and 2 illustrate top plan and side elevation views, respectively, of a prior art fuel management device 500 in an idle state or position. The fuel management device 500 shown is a carburetor. The fuel management device 500 could also be a fuel injection system having a rotatable linkage. Fuel management device 500 is mounted on an intake manifold 501. Fuel management device 500 includes two butterfly valves 502 which control the intake of air. The butterfly valves 502 are connected to a rotatable throttle shaft 504. In the shown idle or low throttle position state, butterfly valves 502 are oriented so as to block air from entering air intake 506. A rotatable linkage member 508 or throttle lever or throttle linkage is attached to rotatable throttle shaft 504, so that when rotatable linkage member 508 is rotated by an accelerator pedal linkage (not shown), rotatable throttle shaft 504 will rotate about axis 510 and thereby rotate butterfly valves 502.

Figure 3:
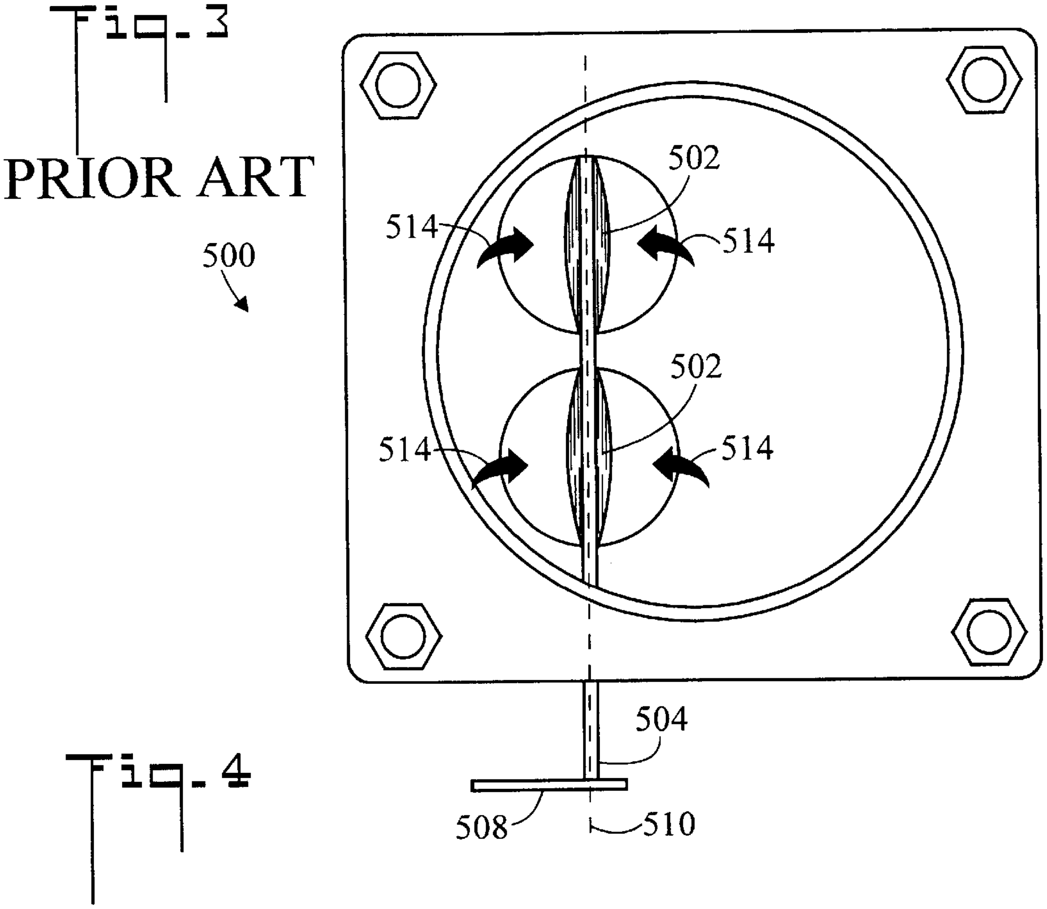
Fig. 3 PRIOR ART
FIG. 3 is a top plan view of the prior art fuel management device in a wide open throttle state.
Figure 4:
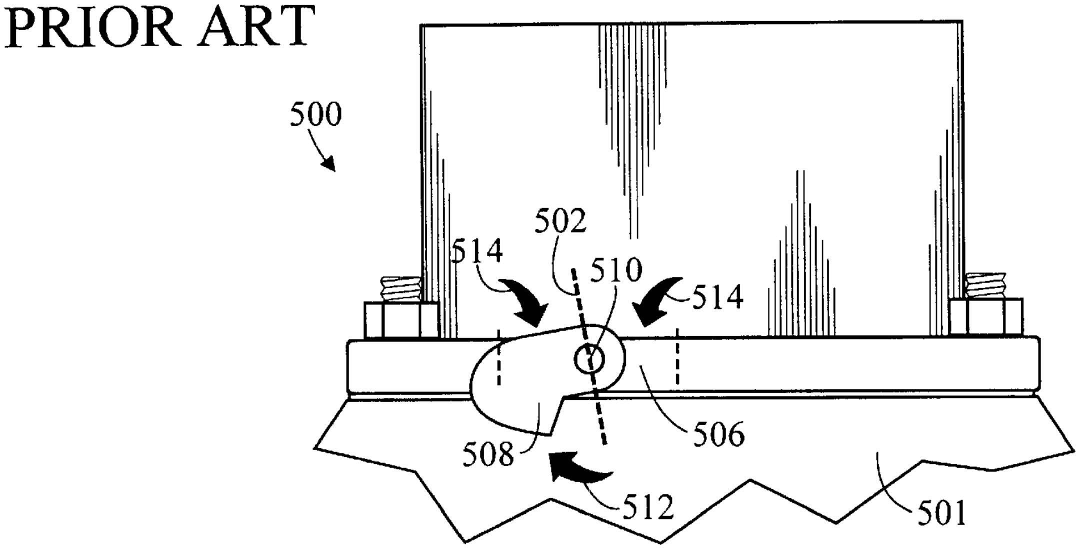
Fig. 4 PRIOR ART
FIG. 4 is a side elevation view of the prior art fuel management device in a wide open throttle state.

FIGS. 3 and 4 are top plan and side elevation views, respectively, of prior art fuel management device 500 in a full or wide open state. Rotatable linkage member 508 has been rotated nominally 80° in direction 512. This in turn causes rotatable throttle shaft 504 and attached butterfly valves 502 to rotate and open air intake 506, thereby allowing air 514 to enter.

Figure 5:
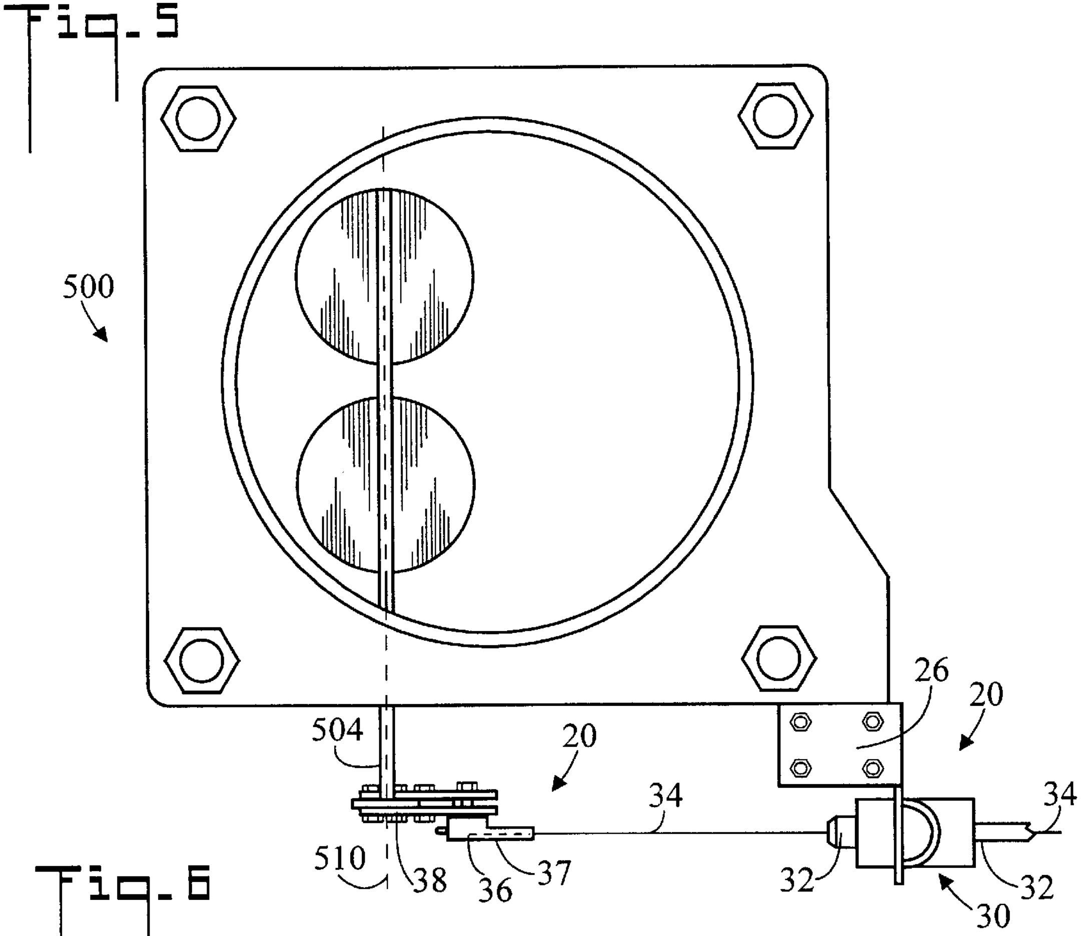
FIG. 5 is a top plan view of the prior art fuel management device in an idle state with the system of the present invention installed.
Figure 6:
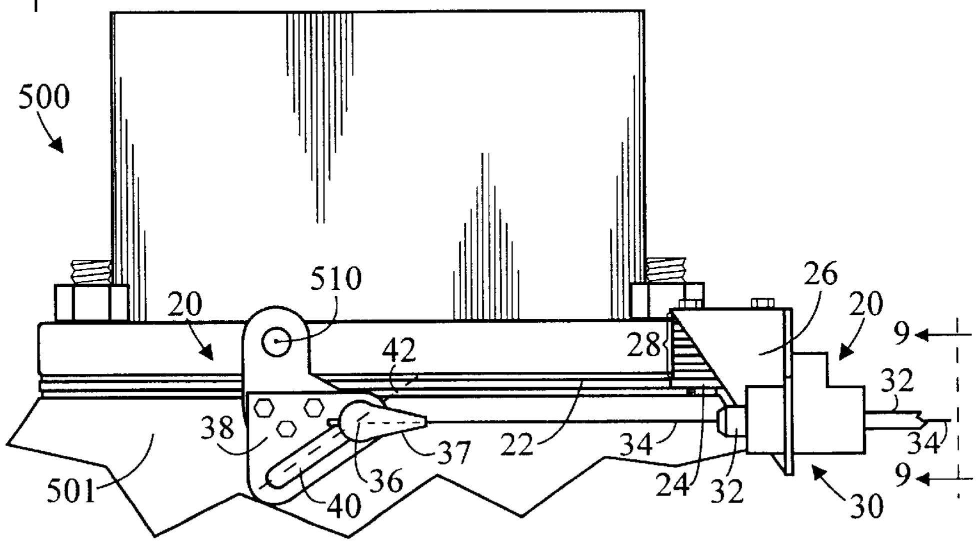
FIG. 6 is a side elevation view of the prior art fuel management device in an idle state with the system of the present invention installed to effect a passive throttle valve response.

FIGS. 5 and 6 are top plan and side elevation views, respectively, of prior art fuel management device 500 in an idle state with the system 20 for controlling a transmission throttle valve in accordance with the present invention installed. As will be described later, the shown configuration will effect a passive transmission throttle valve response. System 20 includes an adapter plate 22 mounted beneath fuel management device 500 (also refer to FIG. 8) on the intake manifold 501. Adapter plate 22 is substantially flat and has a protruding flange portion 24 to attach a bracket 26. Bracket 26 is vertically adjustable with respect to adapter plate 22. In a preferred embodiment the vertical adjustment is achieved by one or more spacers 28 selectively disposable between bracket 26 and adapter plate 22. It may be appreciated that other methods of vertical adjustment could also be employed. A throttle valve cable 30 similar to that shown in U.S. Pat. No. 5,295,408 is connectable to bracket 26. Throttle valve cable 30 is well known in the art, and includes a tubular housing 32 which is fixedly connectable to bracket 26, and a cable 34 which is slidably disposed within tubular housing 32. Cable 34 has a first end 36 and an opposite second end (not shown) which is connectable to the transmission throttle valve. First end 36 includes a cable end fitting 37.

System 20 further includes an adjustment mechanism 38 having a slot 40. Adjustment mechanism 38 is connectable to rotatable linkage member 508 (FIG. 2). In a preferred embodiment, adjustment mechanism 38 is fastened to rotatable linkage member 508 by bolts which fit in holes drilled in rotatable linkage member 508. First end 36 of cable 34 is selectively fixedly connectable along slot 40 so that at any connected position the cable pull distance CP is substantially constant (also refer to FIG. 11). A very important feature of system 20 is that different first end 36 connection positions along slot 40 result in correspondingly different rates of cable pull. That is, by selecting a position along slot 40, the desired shift timing, firmness, and feel may be achieved. Slot 40 has an axis 42 which is generally directed toward and slightly above bracket 26. Slot 40 can either be straight and curved as show in FIGS. 16 and 17.

Figure 7:
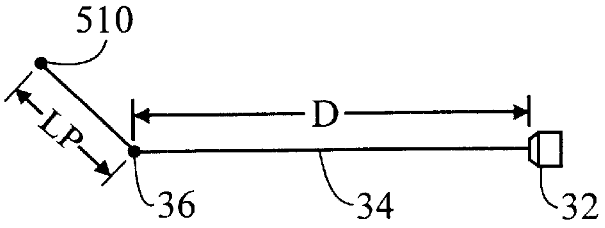
FIG. 7 is a simplified side elevation view of the geometry of the cable connection to the fuel management device of FIG. 6.
Figure 18:
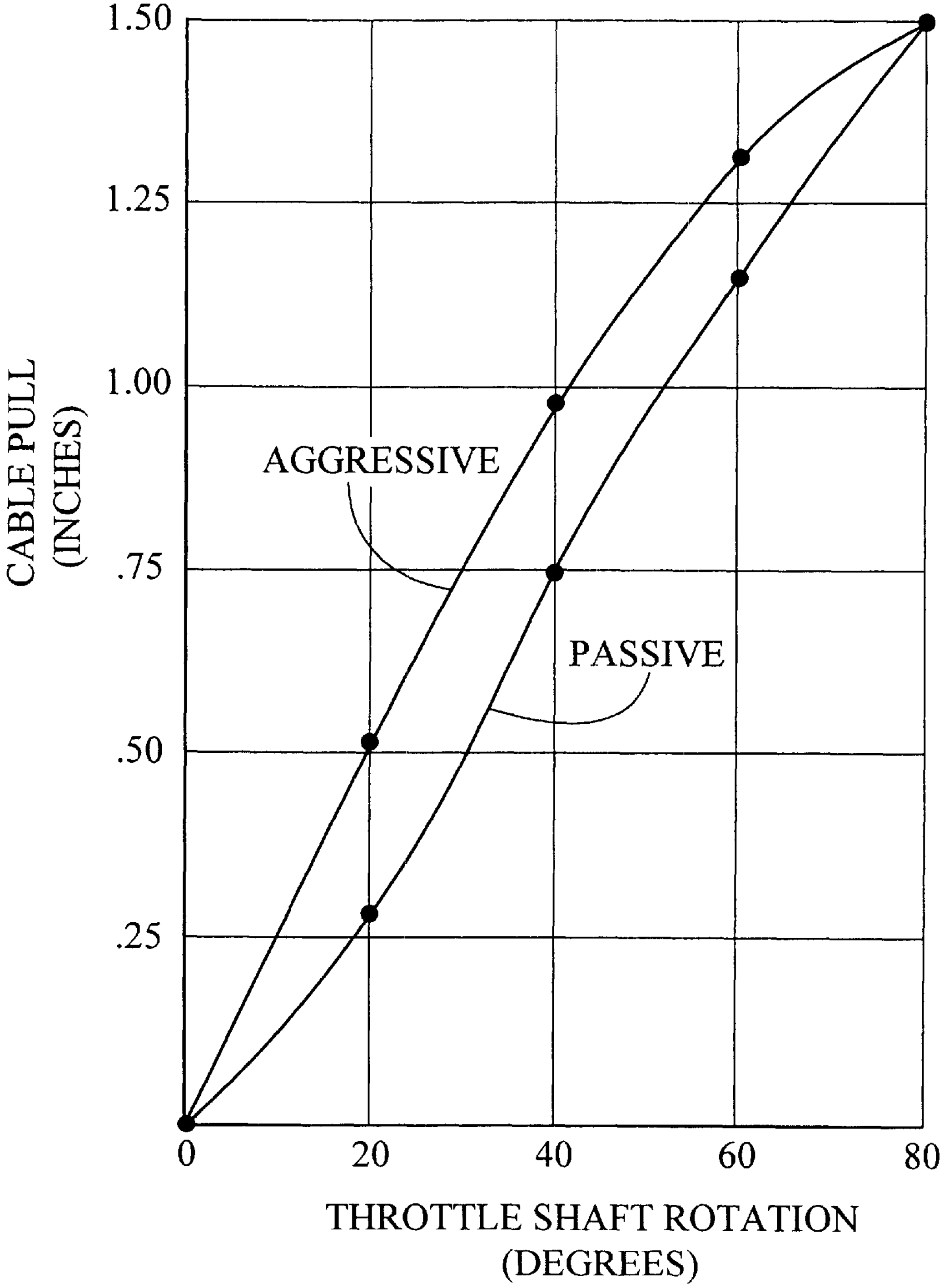

FIG. 7 is a simplified side elevation view of the geometry of the connection of cable 34 to housing 32 of fuel management device 500 of FIG. 6. As seen in FIG. 6, spacers 28 have been placed between bracket 26 and adapter plate 22 so that cable 34 is substantially parallel with adapter plate 22. This controls the approach angle that cable 34 makes with adjustment mechanism 38, which is nominally horizontal. In the shown idle state of fuel management device 500, cable 34 extends a distance D from tubular housing 32 to first end 36. A lever arm LP (lever arm passive) exists between rotation axis 510 and the connection point of first end 36 in slot 40. As is seen in FIG. 6, first end 36 has been connected at the top right of slot 40. This is the connection point which will result in the most passive or lowest rate of transmission throttle valve response as is depicted in FIG. 18.

Figure 8:
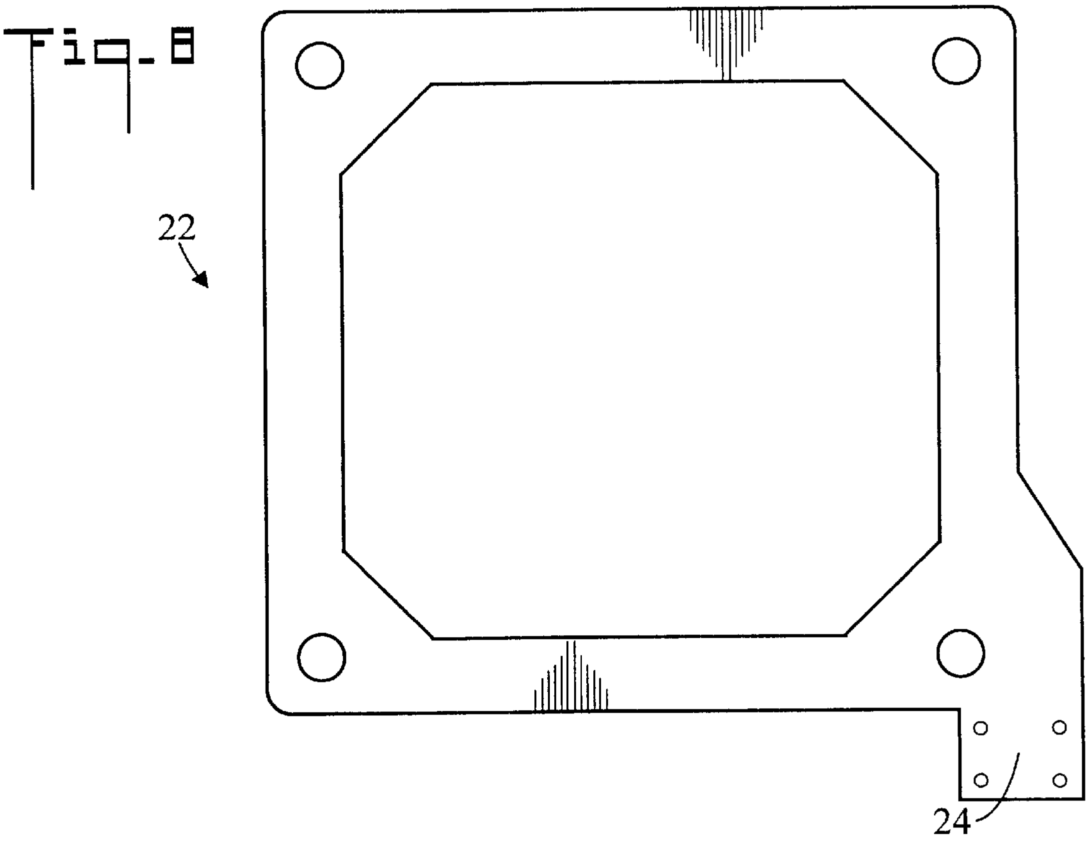
FIG. 8 is a top plan view of an adapter plate.

FIG. 8 is a top plan view of adapter plate 22.

Figure 9:
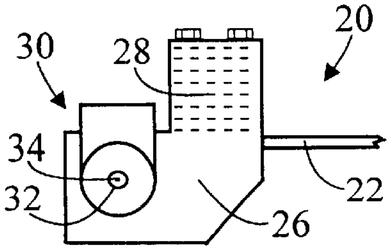
FIG. 9 is an end elevation view of the bracket and throttle valve cable.

FIG. 9 is an end elevation view of bracket 26 and throttle valve cable 30 of the present invention.

Figure 10:
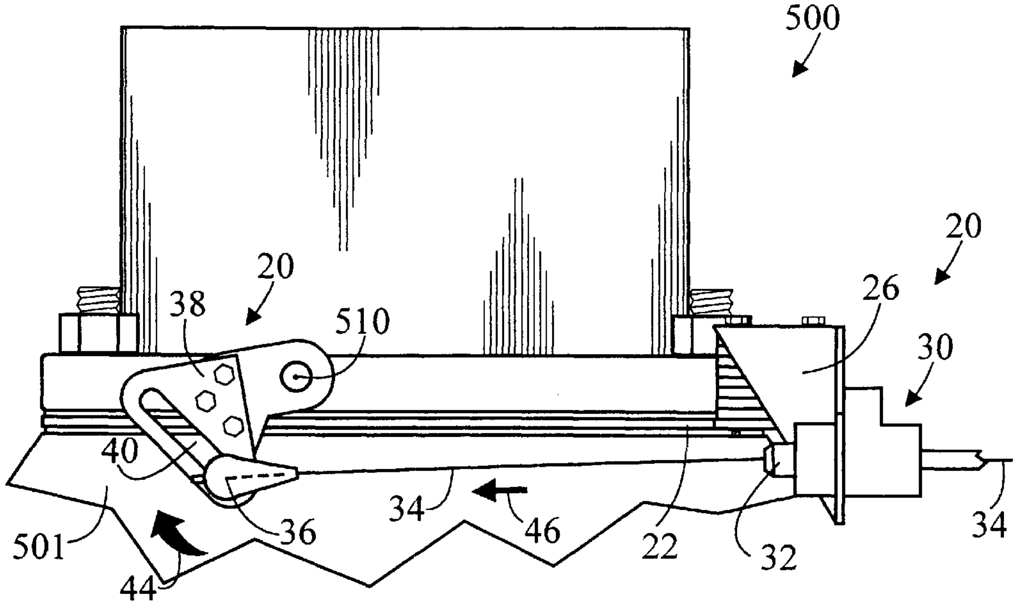
FIG. 10 is a side elevation view of the prior art fuel management device of FIG. 6 in a wide open throttle state with the present invention installed.

FIG. 10 is a side elevation view of prior art fuel management device 500 of FIG. 6 in a wide open throttle state. Rotatable linkage member 508 (FIG. 4) and attached adjustment mechanism 38 have been rotated in direction 44 about axis 510. This rotation causes cable 34 to be pulled in direction 46 from tubular housing 32 of throttle valve cable 30. This cable pull is communicated to the transmission throttle valve via throttle valve cable 30.

Figure 11:
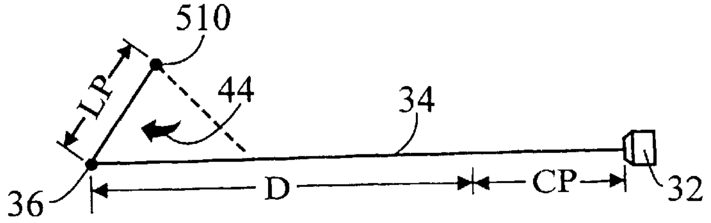
FIG. 11 is a simplified side elevation view of the geometry of the cable connection to the fuel management device of FIG. 10.

FIG. 11 is a simplified side elevation view of the geometry of the connection of cable 34 to housing 32 of fuel management device 500 of FIG. 10 at a wide open throttle state. The rotation in direction 44 has caused an additional amount of cable 34 to be pulled out from tubular housing 32. The amount of cable 34 pulled out is defined as the cable pull or cable pull distance CP. The maximum cable pull CP is fixed for a particular transmission by the travel of the throttle valve. To ensure that the cable pull CP is correct, the length of the lever arm LP is designed to effect the proper cable pull CP. Lengthening LP will increase cable pull CP, and shortening LP will decrease cable pull CP. In FIGS. 6 and 10, LP is determined by the position of the slot in the adjustment mechanism 38. The first end 36 is connected at the top right of slot 40. Then when adjustment mechanism 38 is rotated to a wide open throttle state, a cable pull of desired cable pull length CP results. If a transmission having a different throttle valve travel is installed, a different adjustment mechanism having the slot 40 in a different position from the rotatable linkage member must be used.

Figure 12:
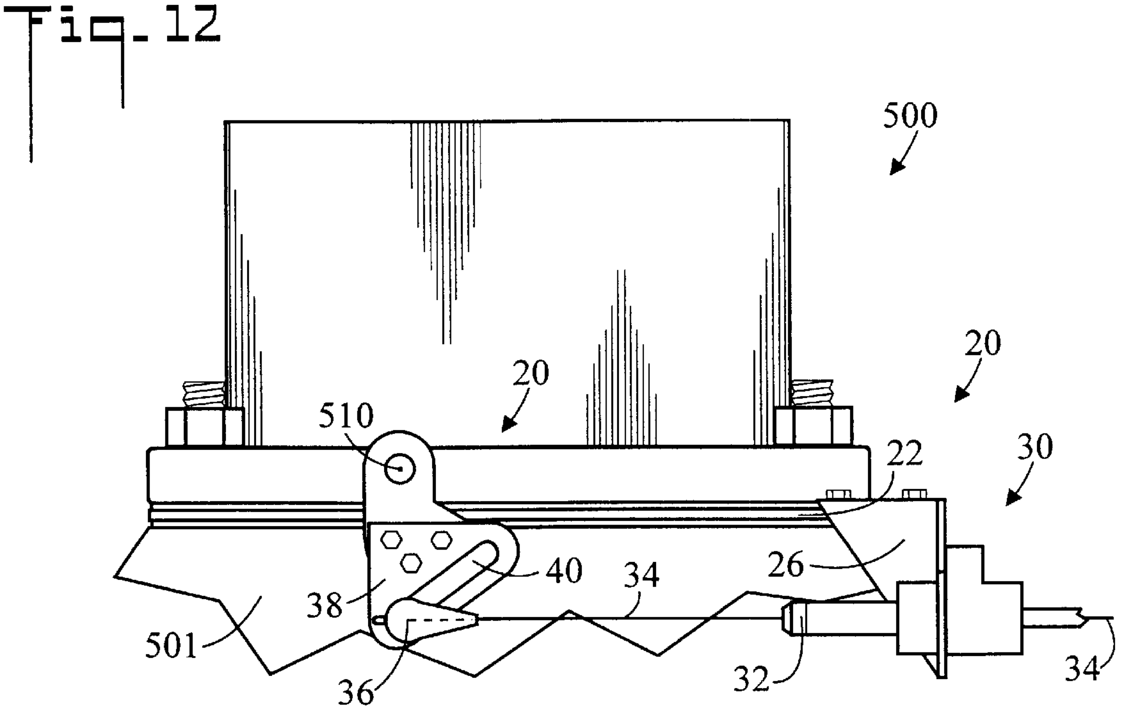
FIG. 12 is a side elevation view of the prior art fuel management device in an idle state with the system of the present invention installed to effect an aggressive throttle valve response.

FIG. 12 is a side elevation view of the prior art fuel management device 500 in an idle state with the system 20 of the present invention installed to effect an aggressive transmission throttle valve response. First end 36 has been connected to the bottom left of slot 40. The spacers 28 shown in FIGS. 6 and 10 have been removed to lower bracket 26 so that cable 34 is again substantially parallel with adapter plate 22. Also, tubular housing 32 has been adjusted toward adjustment mechanism 38 so as to maintain the same initial distance D as in FIGS. 6 and 7. Throttle valve cable 30 has an adjustment feature which permits this longitudinal movement as described in U.S. Pat. No. 5,295,408.

Figure 13:
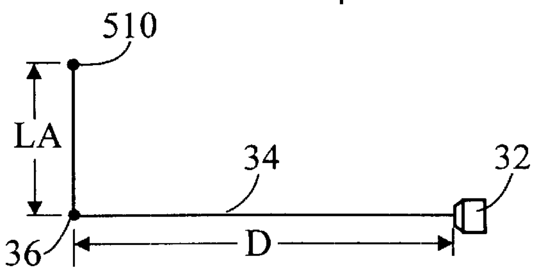
FIG. 13 is a simplified side elevation view of the geometry of the cable connection to the fuel management device of FIG. 12.

FIG. 13 is a simplified side elevation view of the geometry of the cable connection to the fuel management device 500 of FIG. 12. In the shown idle state of fuel management device 500, cable 34 extends a distance D from tubular housing 32 to first end 36 A lever arm LA (lever arm aggressive) exists between rotation axis 510 and the connection point of first end 36 in slot 40. In a preferred embodiment, the connection point of first end 36 is directly beneath axis 510. As is shown in FIG. 12, first end 36 has been connected at the bottom left of slot 40. This is the connection point which will result in the most aggressive or highest rate of transmission throttle valve response as is depicted in FIG. 18. This is because with the 90° relationship at the start of rotation of adjustment mechanism 38, cable 34 is being directly pulled out of tubular housing 32 instead of at an angle.

Figure 14:
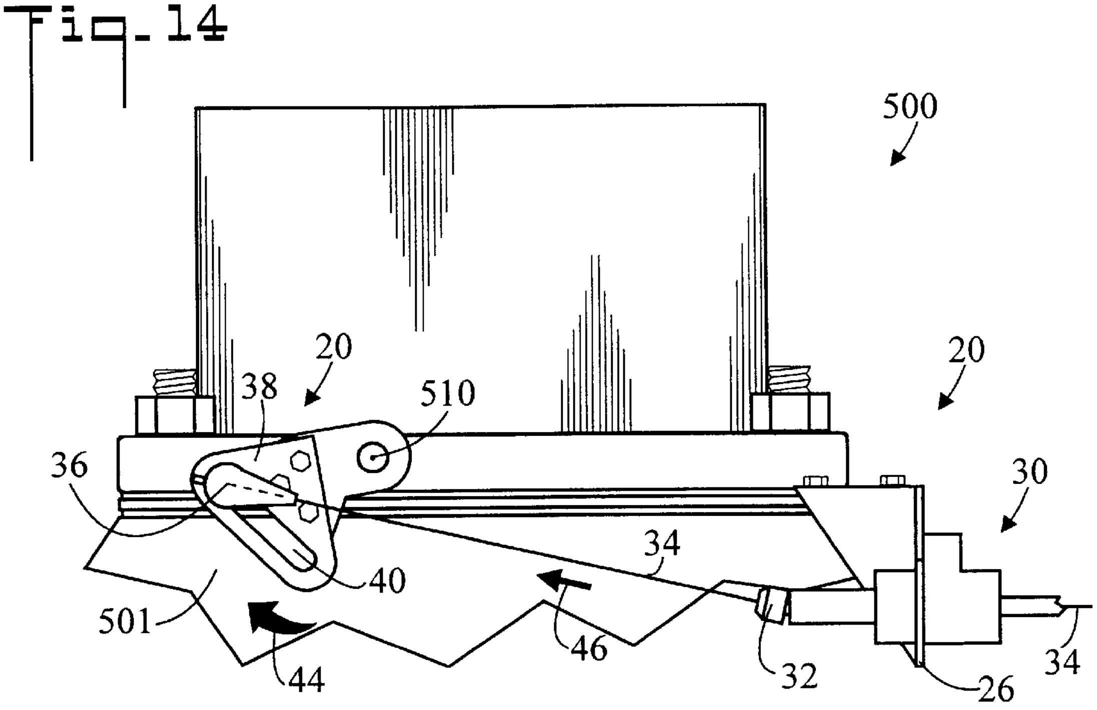
FIG. 14 is a side elevation view of the prior art fuel management device of FIG. 12 in a wide open throttle state.

FIG. 14 is a side elevation view of prior art fuel management device 500 of FIG. 12 in a wide open throttle state. Rotatable linkage member 508 (FIG. 4) and attached adjustment mechanism 38 have been rotated in direction 44 about axis 510. This rotation cause cable 34 to be pulled in direction 46 from tubular housing 32 of throttle valve cable 30. This cable pull is communicated to the transmission throttle valve via throttle valve cable 30.

Figure 15:
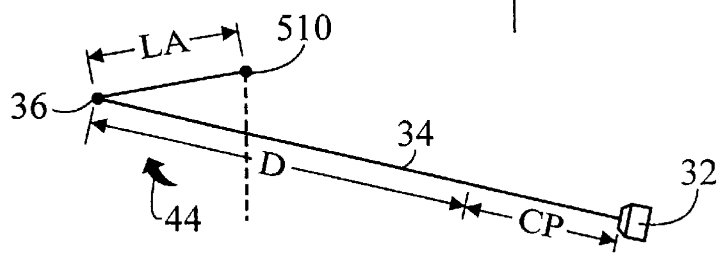
FIG. 15 is a simplified side elevation view of the geometry of the cable connection to the fuel management device of FIG. 14.

FIG. 15 is a simplified side elevation view of the geometry of the connection of cable 34 to tubular housing 32 of fuel management device 500 of FIG. 14 at a wide open throttle state. The rotation in direction 44 has caused an additional amount (cable pull CP) of cable 34 to be pulled out from tubular housing 32. To ensure that the cable pull CP is correct, the length of the lever arm LA is designed to effect the proper cable pull CP. Lengthening LA will increase cable pull CP, and shortening LA will decrease cable pull CP. In FIGS. 12 and 14, LA is determined by the position of the slot in the adjustment mechanism. The first end 36 is connected at the bottom left of slot 40. Then when adjustment mechanism 38 is rotated to a wide open throttle state, a cable pull of desired cable pull length CP results. This is of course the same cable pull CP that was achieved for the most passive adjustment shown in FIGS. 6 and 10 and is obtained by the position of the slot. That is, the position of slot 40 in relation to rotation axis 510 assures that the lever arms LP, LA, and every lever arm in between are such that the cable pull CP is substantially the same in all possible locations. CP, in fact, must always be substantially the same because it is dictated by the maximum travel of the throttle valve in the automatic transmission. If a different CP is desired for a different throttle valve in a different transmission, a different adjustment mechanism having a different slot must be used as noted above.

Figure 16:
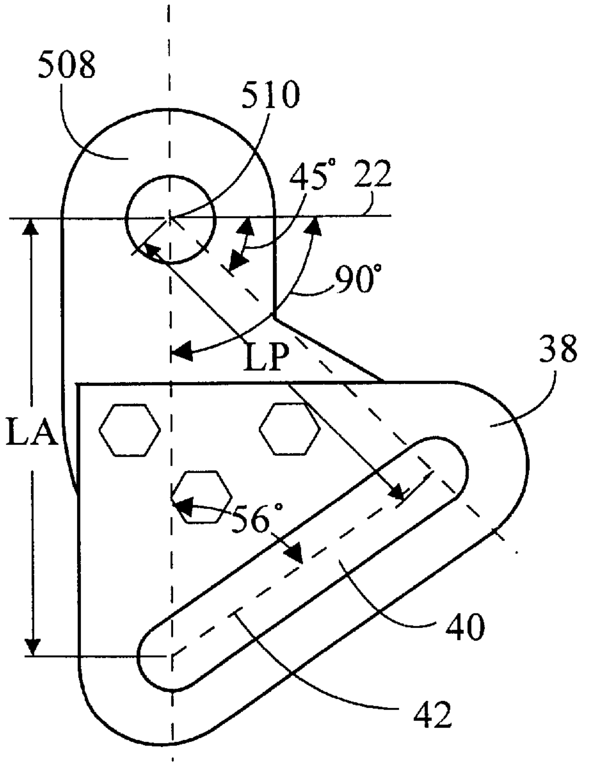
FIG. 16 is an enlarged side elevation view of the adjustment mechanism of the present invention.

FIG. 16 is an enlarged side elevation view of the adjustment mechanism 38 of the present invention. In one usefull embodiment, the lever arm passive LP is 1.16 inches, and is disposed along a line which is 45° from adapter plate 22. And the lever arm aggressive LA is 1.38 inches and is disposed along a line which is 90° from adapter plate 22. This configuration results in the shown slot axis 42 having an angle of approximately 56° from the line which is perpendicular to the adapter plate 22.

Figure 17:
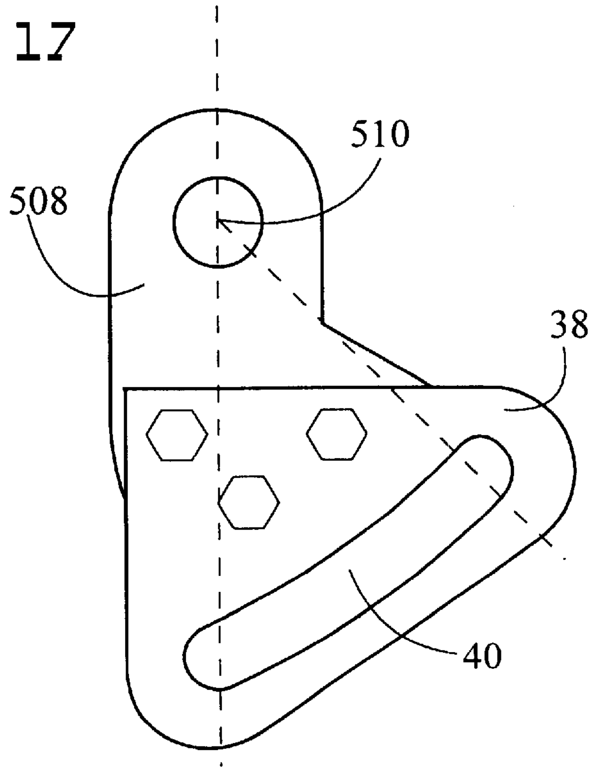
FIG. 17 is an enlarged side elevation view of a second embodiment of the adjustment mechanism; and, FIG. 18 is a graph showing cable pull distance in relation to throttle shaft rotation for both passive and aggressive throttle valve responses.

FIG. 17 is an enlarged side elevation view of a second embodiment of adjustment mechanism 38. While slot 40 shown in FIG. 16 is straight, in actuality in most configurations slot 40 must be slightly curved away from axis 510 in the middle in order to ensure that the cable pull CP is the same for all positions along slot 40. The curvature is small, typically requiring about a 0.050 inch outward increase in middle slot distance from axis 510. The end points corresponding to the positions for LP and LA in FIG. 16 remain the same. Component tolerances can sum to more than this amount. Therefore, in practice, a straight slot 40 will usually function satisfactorily.

FIG. 18 is a graph showing cable pull distance in relation to throttle shaft rotation for both passive and aggressive throttle valve responses. It is noted that the passive connection shown in FIGS. 6 and 10 results in a lesser cable pull response at the start as a function of throttle shaft rotation. Conversely, the aggressive connection shown in FIGS. 12 and 14 results in a greater cable pull response at the start as a function of throttle shaft rotation. This difference in the rate of cable pull causes the transmission throttle valve to change the performance of the transmission. When the first end 36 of the TV cable is attached at an intermediate point between the most passive and aggressive positions, a curve results which is between the two curves shown in FIG. 18. The cable pull CP in all cases is 1.5 inches.

The system 20 of the present invention has been found useful in connecting TH-700-R4 and TH-200-4R automatic transmissions sold by General Motors of Detroit, Mich. to Holley 4100 Performance Series carburetors sold by Holley Performance Products of Bowling Green, Ky., Demon carburetors sold by Demon Carbs of Dahlonega, Ga., and Carter AFB Series carburetors sold by Federal-Mogul Corporation of Southfield, Mich.

Other transmissions have throttle valves with other travel distances requiring cable pulls CP which range from 1.4 to 1.75 inches. Different adjustment members 38 having different slot positions and lengths are therefore required for each of them to meet their particular cable pull CP requirements.

In terms of use, the method for controlling a transmission throttle valve includes: providing an adapter plate 22, a bracket 26, a throttle valve cable 30 having a tubular housing 32 and a cable 34 slidably disposed within the tubular housing 32, the cable 34 having first 36 and second ends, a fuel management device 500 having a rotatable linkage member 508, an adjustment mechanism 38 having a slot 40, and a vertical adjuster 28; mounting adapter plate 22 beneath fuel management device 500; connecting tubular housing 32 of throttle valve cable 30 to bracket 26; ensuring that rotatable linkage member 508 is in an idle position, and connecting adjustment mechanism 38 to rotatable linkage member 508; connecting first end 36 of cable 34 to a desired position along slot 40, and connecting the second end to the transmission throttle valve; using vertical adjuster 28 to adjust the vertical position of bracket 26 with respect to adapter plate 22; connecting bracket 26 to adapter plate 22; and, rotating rotatable linkage member 508 from the idle position to a full throttle position and observing that cable 34 outwardly moves a desired distance from tubular housing 32. In a preferred embodiment, during the step of adjusting the vertical position of bracket 26 with respect to adapter plate 22, ensuring that cable 34 is substantially parallel with adapter plate 22. The response of the transmission may then be adjusted by disconnecting first end 36 of cable 34 and re-connecting first end 34 to a different position along slot 40. In another preferred embodiment, throttle valve cable tubular housing 32 has a longitudinal adjustment, wherein the tubular housing is longitudinally adjusted so as to maintain a predetermined distance D between tubular housing 32 and first end 36 of cable 34. In another embodiment of the present invention, the vertical distance between bracket 26 and adapter plate 22 can be adjusted slightly to effect “fine tuning” changes in the cable pull distance CP.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A system for controlling a transmission throttle valve in a vehicle having a fuel management device and an intake manifold, the fuel management device having a rotatable linkage member, said system comprising:

an adapter plate mountable on the intake manifold between the fuel management device and the intake manifold;

a bracket connectable to said adapter plate;

a throttle valve cable connectable to said bracket;

an adjustment mechanism having a slot, said adjustment mechanism connectable to the rotatable linkage member;

said throttle valve cable having a tubular housing fixedly connectable to said bracket and a cable slidably disposed within said tubular housing, said cable having a first end and an opposite second end connectable to the transmission throttle valve; and, said first end selectively connectable along said slot so that at any connection position a cable pull distance is substantially constant.

2. A system according to claim 1, further including:

said bracket vertically adjustable with respect to said adapter plate;

a plurality of spacers selectively disposable between said bracket and said adapter plate to effect said vertical adjustment.

3. A system according to claim 1, further including:

said adapter plate being substantially flat and having a protruding flange portion for connecting said bracket;

an adjustment mechanism having a slot, said adjustment mechanism connectable to a rotatable linkage member;

said throttle valve cable having a tubular housing fixedly connectable to said bracket and a cable slidably disposed within said tubular housing, said cable having a first end and an opposite second end connectable to the transmission throttle valve;

said first end selectively connectable along said slot so that at any connected position a cable pull distance is substantially constant;

different said first end connection positions along said slot resulting in correspondingly different rates of cable pull;

said bracket vertically adjustable with respect to said adapter plate;

said slot being curved;

said bracket vertically adjustable with respect to said adapter plate; and, a plurality of spacers selectively disposable between said bracket and said adapter plate to effect said vertical adjustment.

4. A system according to claim 1, further including:

different said first end connection positions along said slot resulting in correspondingly different rates of cable pull.

5. A system according to claim 1, further including:

said slot having an axis generally directed toward said bracket.

6. A system according to claim 1, further including:

said slot being one of straight and curved.

7. A system according to claim 6, wherein said slot is curved and bends outwardly about 0.050 inch from a throttle shaft axis.

8. A system for controlling a transmission throttle valve in a vehicle having a fuel management device having a rotatable linkage member, comprising:

an adapter plate mountable beneath the fuel management device;

a bracket connectable to said adapter plate;

a throttle valve cable connectable to said bracket.

an adjustment mechanism having a slot, said adjustment mechanism connectable to the rotatable linkage member;

said throttle valve cable having a tubular housing fixedly connectable to said bracket and a cable slidably disposed within said tubular housing, said cable having a first end and an opposite second end connectable to the transmission throttle valve;

said first end selectively connectable along said slot so that at any connection position a cable pull distance is substantially constant;

said slot being one of straight and curved; and, wherein a line through the ends of said slot forms an angle of 36° to 76° with a perpendicular to said adapter plate.

9. A system according to claim 8, wherein the line forms an angle of 46° to 66° with a perpendicular to said adapter plate.

10. A system according to claim 9, wherein the line forms an angle of substantially 56° with a perpendicular to said adapter plate.

11. A system according to claim 10, wherein the slot is curved and bends away from the axis of the rotatable linkage member from 0.040 and 0.060 inch.

12. A system for controlling a transmission throttle valve in a vehicle having a fuel management device having a rotatable linkage member, said system comprising:

an adjustment mechanism having a slot, said adjustment mechanism connectable to the rotatable linkage member;

a throttle valve cable having a tubular housing and a cable slidably disposed within said tubular housing, said cable having a first end and an opposite second end connectable to the transmission throttle valve; and, said first end selectively connectable along said slot so that at any connected position a cable pull distance is substantially constant.

13. A system according to claim 12, further including:

said slot being curved.

14. A system according to claim 12, further including:

different said first end connection positions along said slot resulting in correspondingly different rates of cable pull.

15. A system according to claim 12, the vehicle having an intake manifold, said system further including:

an adapter plate mountable on the intake manifold between the fuel management device and the intake manifold;

a bracket connectable to said adapter plate; and, said throttle valve cable connectable to said bracket.

16. A system according to claim 15, further including:

said adapter plate being substantially flat and having a protruding flange portion for connecting said bracket.

17. A system according to claim 15, further including:

said bracket vertically adjustable with respect to said adapter plate.

18. A system according to claim 17, further including:

a plurality of spacers selectively disposable between said bracket and said adapter plate to effect said vertical adjustment.

19. A system for controlling a transmission throttle valve in a vehicle having a fuel management device having a rotatable linkage member, said system comprising:

an adjustment mechanism having a slot, said adjustment mechanism connectable to the rotatable linkage member;

a throttle valve cable having a tubular housing and a cable slidably disposed within said tubular housing, said cable having a first end and an opposite second end connectable to the transmission throttle valve;

said first end selectively connectable along said slot so that at any connected position a cable pull distance is substantially constant;

said slot being one of straight and curved; and, wherein a line through the ends of the slot forms an angle of 36° to 76° with a perpendicular to said adapter plate.

20. A system according to claim 19, wherein the line forms an angle of 46° to 66° with a perpendicular to said adapter plate.

21. A system according to claim 20, wherein the line forms an angle of substantially 56° with a perpendicular to said adapter plate.

22. A system according to claim 19, wherein the slot is curved and bends away from the axis of the rotatable linkage member from 0.040 and 0.060 inch.

23. A system according to claim 22, wherein the slot bends away substantially 0.050 inch.

* * * * *